United States Patent
Kwon

(10) Patent No.: US 10,583,741 B2
(45) Date of Patent: Mar. 10, 2020

(54) METHOD OF COOLING CONTROL FOR DRIVE MOTOR OF ELECTRIC VEHICLE

(71) Applicant: Hyundai Motor Company, Seoul (KR)

(72) Inventor: Mun Soon Kwon, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 434 days.

(21) Appl. No.: 15/377,916

(22) Filed: Dec. 13, 2016

(65) Prior Publication Data

US 2018/0111486 A1  Apr. 26, 2018

(30) Foreign Application Priority Data

Oct. 20, 2016  (KR) .................. 10-2016-0136560

(51) Int. Cl.
- *B60L 3/00* (2019.01)
- *B60K 11/00* (2006.01)
- *B60K 1/00* (2006.01)

(52) U.S. Cl.
CPC ............ *B60L 3/0061* (2013.01); *B60K 11/00* (2013.01); *B60K 1/00* (2013.01); *B60K 2001/006* (2013.01); *B60L 2240/12* (2013.01); *B60L 2240/14* (2013.01); *B60L 2240/425* (2013.01); *B60L 2240/64* (2013.01); *B60L 2260/56* (2013.01); *Y02T 10/642* (2013.01); *Y02T 10/7291* (2013.01); *Y02T 90/16* (2013.01)

(58) Field of Classification Search
None
See application file for complete search history.

(56) References Cited

U.S. PATENT DOCUMENTS

| | | | | |
|---|---|---|---|---|
| 3,850,109 A | * | 11/1974 | Thornton | B60L 13/10 104/285 |
| 6,239,502 B1 | * | 5/2001 | Grewe | B60K 6/46 290/1 B |
| 2002/0005436 A1 | * | 1/2002 | Hirota | F25B 41/06 236/92 R |
| 2007/0266965 A1 | * | 11/2007 | Hoi | F01P 3/202 123/41.45 |

(Continued)

FOREIGN PATENT DOCUMENTS

| | | |
|---|---|---|
| KR | 1020110054319 A | 5/2011 |
| KR | 1020130051298 A | 5/2013 |

*Primary Examiner* — Nicholas K Wiltey
(74) *Attorney, Agent, or Firm* — Slater Matsil, LLP

(57) ABSTRACT

Disclosed is a method of cooling control for a drive motor of an electric vehicle, the method including: a normal driving step of controlling the output of the cooling apparatus to be in proportion to a driving speed of the electric vehicle; a sensing step of predicting changes in the driving speed of the electric vehicle during the normal driving step; a first supercooling step of cooling residual heat of the drive motor prior to beginning of deceleration by temporarily operating the cooling apparatus at a higher output than the output controlled in the normal driving step, when deceleration is predicted in the sensing step; and a second supercooling step of cooling the drive motor in advance by temporarily operating the cooling apparatus at a higher output than the output controlled in the normal driving step, when acceleration is predicted in the sensing step after performing the first supercooling step.

17 Claims, 5 Drawing Sheets

(56) References Cited

U.S. PATENT DOCUMENTS

| | | | |
|---|---|---|---|
| 2007/0289326 A1* | 12/2007 | Nishikawa | B60H 1/3211 62/498 |
| 2009/0015205 A1* | 1/2009 | Katayama | H02J 7/1453 320/134 |
| 2010/0025125 A1* | 2/2010 | Bienert | B60H 1/00278 180/65.1 |
| 2010/0100266 A1* | 4/2010 | Yoshinori | B60K 1/04 701/22 |
| 2010/0121513 A1* | 5/2010 | Itoh | B60K 6/365 701/22 |
| 2010/0295391 A1* | 11/2010 | Perkins | B60K 6/48 310/64 |
| 2011/0106358 A1* | 5/2011 | Sawada | B60K 11/02 701/22 |
| 2011/0132291 A1* | 6/2011 | Ulrey | F01P 7/167 123/41.1 |
| 2013/0167532 A1* | 7/2013 | Parenti | F01K 25/00 60/645 |
| 2014/0171260 A1* | 6/2014 | Dalum | B60W 20/10 477/5 |
| 2014/0219848 A1* | 8/2014 | Rabhi | F16C 33/306 418/24 |
| 2015/0066236 A1* | 3/2015 | Gehring | F01P 7/167 701/1 |
| 2015/0152948 A1* | 6/2015 | Johnson | B60K 6/26 60/337 |
| 2016/0160923 A1* | 6/2016 | Kawamura | C10M 169/04 384/462 |
| 2016/0201590 A1* | 7/2016 | Ouchida et al. | F02D 41/22 701/31.5 |
| 2016/0272039 A1* | 9/2016 | Cheng | B60H 1/2221 |
| 2017/0174094 A1* | 6/2017 | Meitinger | B60L 1/08 |
| 2017/0314455 A1* | 11/2017 | Rejeti | F01P 11/18 |
| 2018/0111486 A1* | 4/2018 | Kwon | B60K 11/00 |
| 2018/0328261 A1* | 11/2018 | Babbitt | F01P 7/044 |

* cited by examiner

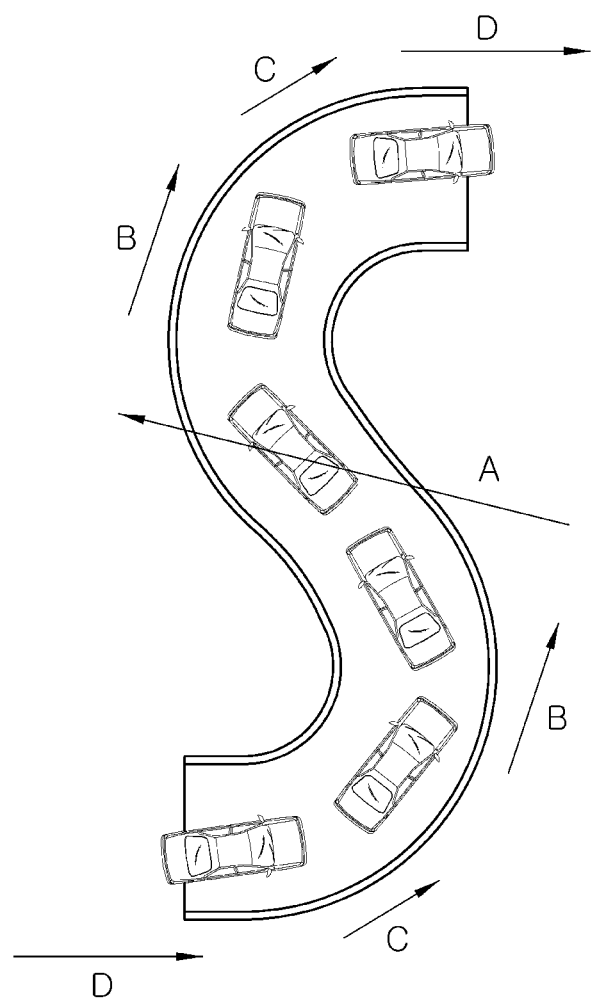
[Fig.1]

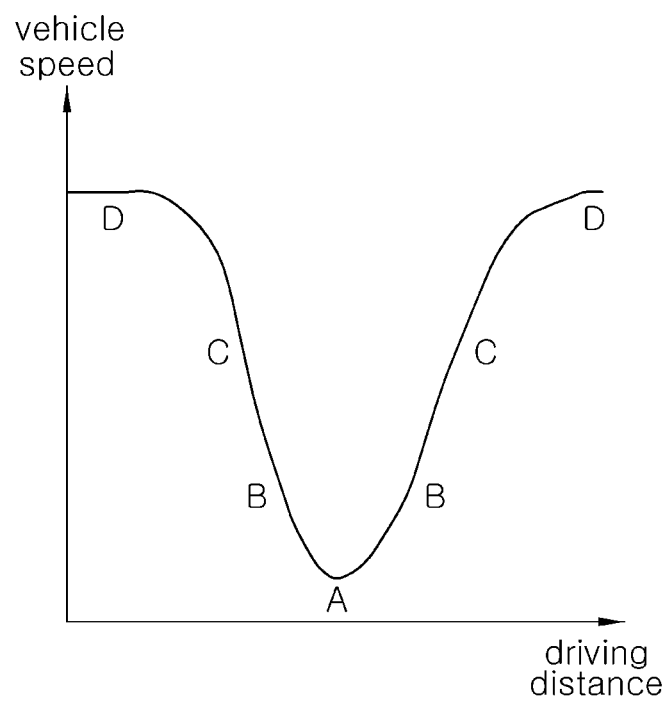

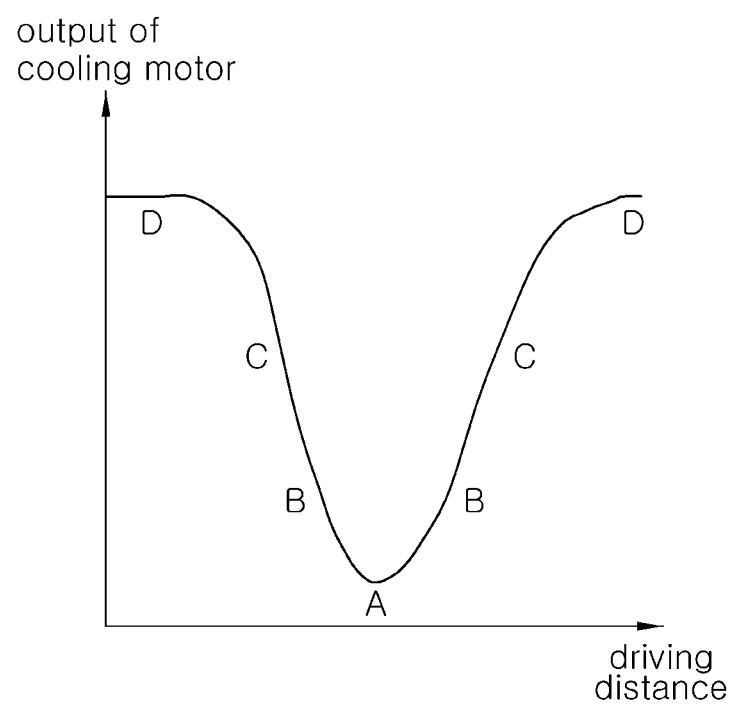
[Fig.2B]

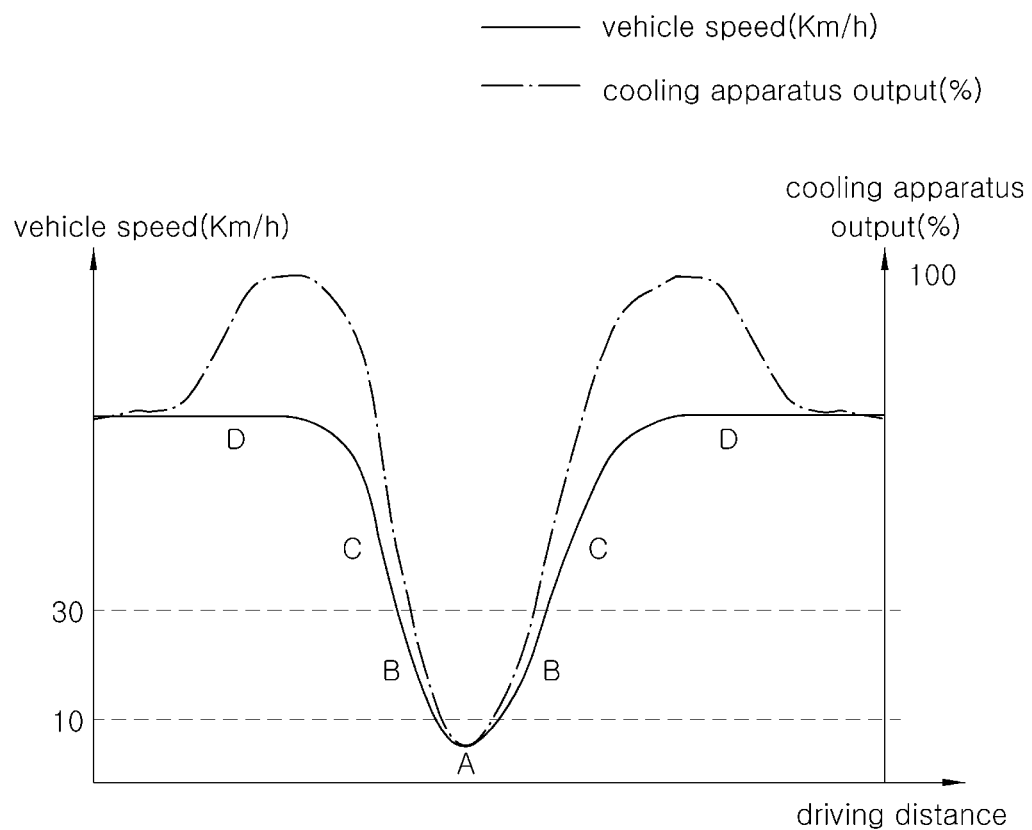
[Fig.3]

[Fig.4]
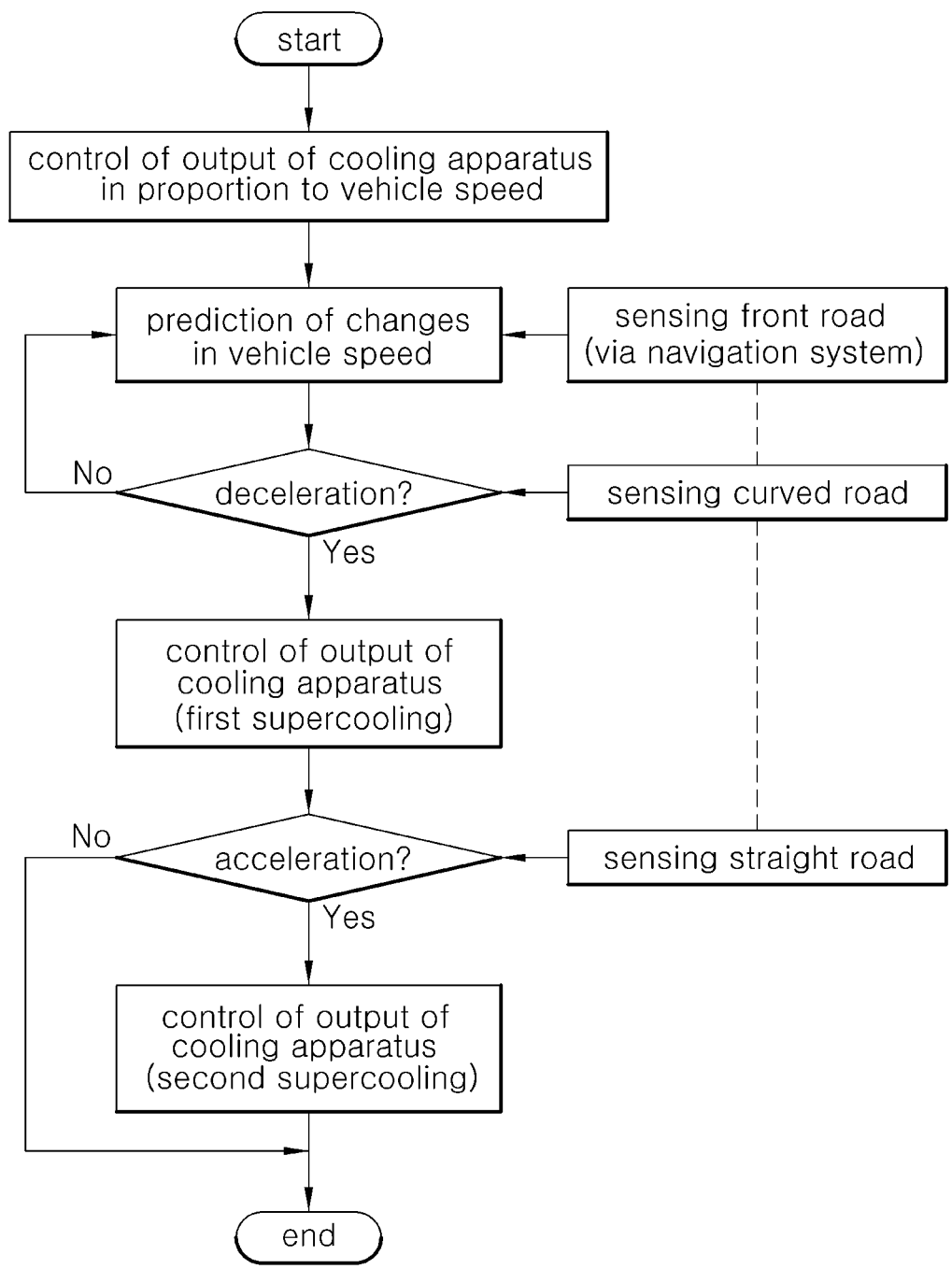

METHOD OF COOLING CONTROL FOR DRIVE MOTOR OF ELECTRIC VEHICLE

CROSS-REFERENCE TO RELATED APPLICATIONS

The present application claims priority to Korean Patent Application No. 10-2016-0136560, filed Oct. 20, 2016, the entire contents of which is incorporated herein for all purposes by this reference.

TECHNICAL FIELD

The present invention relates generally to a method of cooling control for a drive motor of an electric vehicle.

BACKGROUND

Generally, an electric vehicle is provided with many components generating heat, such as a battery, a drive motor, and other electric devices. However, if these components are overly heated, efficiency thereof may be lowered. Accordingly, an additional cooling apparatus is required to cool the components.

Of these components, in the case of the drive motor that rotates wheels of the electric vehicle, a water-cooled cooling apparatus using an electric water pump (EWP), and an air-cooled cooling apparatus using a pulse-width modulation (PWM) cooling fan are used as the cooling apparatus. The above cooling methods may help to improve fuel efficiency by controlling an output of the cooling apparatus to cool the drive motor by a required cooling rate.

As shown in FIGS. 1, 2A, and 2B, conventionally, the output of the cooling apparatus is controlled to be in proportion to a vehicle speed. In other words, when a vehicle currently running at a speed of D enters an S-curved road, the vehicle is decelerated at speeds of C, B, and A according to its location on the road. After that, as the vehicle moves from the S-curved road, the vehicle is accelerated at speeds of B, C, and D.

Here, a graph of a vehicle speed shown in FIG. 2A and a graph of an output of a cooling apparatus shown in FIG. 2B have the same shape, and it is recognized that the vehicle speed and the output of the cooling apparatus are controlled to be in proportion to each other.

However, in the case of sudden deceleration of the vehicle, the output of the cooling apparatus is also dramatically decreased, and thereby residual heat remaining in the drive motor cannot be removed, and accordingly, efficiency of the drive motor is lowered. Further, in the case of sudden acceleration of the vehicle from a low speed, temperature of the drive motor rises since the output is insufficient to efficiently cool heat generated from the drive motor even when the output of the cooling apparatus is increased.

Accordingly, a new method of cooling control is required to efficiently cool the drive motor when the vehicle speed is suddenly changed.

The foregoing is intended merely to aid in the understanding of the background of the present invention, and is not intended to mean that the present invention falls within the purview of the related art that is already known to those skilled in the art.

SUMMARY

The present invention relates generally to a method of cooling control for a drive motor of an electric vehicle. In particular embodiments, the present invention relates to a method of controlling an output of a cooling apparatus according to a driving speed of the electric vehicle.

Embodiments of the present invention provide a method of cooling control for a drive motor of an electric vehicle capable of realizing high cooling efficiency even when a vehicle speed is suddenly changed.

In order to achieve the above object, according to one aspect of the present invention, there is provided a method of cooling control for a drive motor of an electric vehicle, in which an output of a cooling apparatus for cooling the drive motor of the electric vehicle is controlled. The method includes a normal driving step of controlling the output of the cooling apparatus to be in proportion to a driving speed of the electric vehicle. A sensing step predicts changes in the driving speed of the electric vehicle during the normal driving step. A first supercooling step cools residual heat of the drive motor prior to beginning of deceleration by temporarily operating the cooling apparatus at a higher output than the output controlled in the normal driving step, when deceleration is predicted in the sensing step. A second supercooling step cools the drive motor in advance by temporarily operating the cooling apparatus at a higher output than the output controlled in the normal driving step, when acceleration is predicted in the sensing step after performing the first supercooling step.

The first supercooling step may be performed when the driving speed of the electric vehicle is predicted to be decreased to lower than 10 Km/h.

The second supercooling step may be performed when the driving speed of the electric vehicle is predicted to be increased to higher than 30 Km/h after performing the first supercooling step.

The sensing step may predict that the electric vehicle is to be decelerated when a curved section exists in front of the electric vehicle running on a straight section of a road.

The sensing step may predict that the electric vehicle is to be accelerated when a straight section exists in front of the electric vehicle running on a curved section of a road.

The sensing step may identify whether a curved section or a straight section exists on a road in front of the electric vehicle running on the road, by using a navigation system.

The method of cooling control for a drive motor of an electric vehicle according to the present invention has the following advantageous effects:

First, in the case of sudden deceleration or sudden acceleration where the drive motor is likely to be overheated, it is possible to improve cooling efficiency by increasing the output of the cooling apparatus.

Second, it is possible to minimize energy consumption by determining when to increase the output of the cooling apparatus based on a curved road or a straight road by using a navigation system.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a schematic view showing a vehicle running on a curved road;

FIGS. 2A and 2B are graphs showing control of an output of a cooling apparatus in proportion to vehicle speed in a conventional electric vehicle;

FIG. 3 is a graph showing control of the output of the cooling apparatus in response to changes in vehicle speed in a method of cooling control according to an embodiment of the present invention; and FIG. 4 is a flow chart showing the method of cooling control according to the embodiment of the present invention.

DETAILED DESCRIPTION OF ILLUSTRATIVE EMBODIMENTS

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Hereinbelow, an exemplary embodiment of the present invention will be described in detail with reference to the accompanying drawings. Throughout the drawings, the same reference numerals will refer to the same or like pails.

The present invention is roughly constituted by a normal driving step, a sensing step, first supercooling step, and a second supercooling step. The normal driving step and the sensing step are repeatedly performed throughout the entire process of running of an electric vehicle, and it is preferred that the first supercooling step and the second supercooling step are performed when a predetermined condition is satisfied in the sensing step. Hereinbelow, reference will be made in more detail to each step.

The normal driving step is a step of controlling an output of a cooling apparatus to be in proportion to a vehicle speed, which is similar to a conventional manner of controlling a drive motor cooling apparatus.

As shown in FIGS. 2A and 2B, in the normal driving step, the output of the cooling apparatus is controlled to be in proportion to a speed of the electric vehicle.

The reason why the output of the cooling apparatus is controlled according to the speed of the electric vehicle is that the higher the speed is, the heavier the load applied to the drive motor, and much more heat is generated, so the output of the cooling apparatus is increased to increase cooling efficiency. On the contrary, when the speed is low, heat generation rate decreases, so the output of the cooling apparatus is decreased, thereby reducing energy consumption.

The sensing step is performed to correct the output of the cooling apparatus drawn from the normal driving step, wherein the sensing step is performed to increase the output of the cooling apparatus ahead of sudden acceleration or sudden deceleration by predicting sudden acceleration or sudden deceleration of the electric vehicle.

The sensing step predicts changes in the speed of the electric vehicle by using a current speed of the electric vehicle and a forward road shape inputted by a navigation system, etc. The predicted changes in the speed of electric vehicle are used to determine whether the first supercooling step and the second supercooling step are performed or not.

The sensing step predicts changes in the speed of the electric vehicle by comparing a shape of a road where the electric vehicle is currently running with a shape of a road in front of the electric vehicle. In other words, the sensing step may predict that that the electric vehicle is to be decelerated when a curved section exists in front of the electric vehicle currently running on a straight section of a road, and may predict that the electric vehicle is to be accelerated when a straight section exists in front of the electric vehicle currently running on a curved section of a road.

When the sensing step predicts changes in the speed of the electric vehicle, accuracy of prediction may be improved by using information on changes in speed at the time when the electric vehicle has actually run on the road concerned. Further, in the case where the electric vehicle has not actually run on the road concerned, if information on driving history about a similar road exists, it is possible to predict changes in the speed of the electric vehicle by using the information.

The first supercooling step is performed to remove residual heat remaining in the drive motor when the electric vehicle is decelerated during high-speed driving, and the second supercooling step is performed to cool the drive motor in advance when the electric vehicle is accelerated during low-speed driving.

It is preferred that the first supercooling step is performed when the driving speed of the electric vehicle is predicted to be decreased to lower than 10 Km/h (about 6 mi/hr). The reason for this is that cooling efficiency of the drive motor is lowered because the output of the cooling apparatus corresponding to a speed lower than 10 km/h is very low.

When the first supercooling step is performed, the output of the cooling apparatus is temporarily controlled to be higher than an output corresponding to a current speed of the electric vehicle, wherein the output of the cooling apparatus may be determined by comprehensively considering a current temperature of the drive motor, mileage, and the like. For example, after the output of the cooling apparatus is increased up to 100%, the output of the cooling apparatus may be decreased to correspond to the current speed of the electric vehicle.

It is preferred that the second supercooling step is performed after the first supercooling step is performed. To be more specific, it is preferred that the second supercooling step is performed when the sensing step predicts that the driving speed of the electric vehicle is to be increased from lower than 10 km/h to higher than 30 Km/h (about 20 mi/hr). As an exception, the second supercooling step may be performed at the initial start of the electric vehicle in the same manner.

The reason for this is that an increase speed of heat generated from the drive motor is faster than that of the output of the cooling apparatus when the driving speed of the electric vehicle is increased from lower than 10 km/h to higher than 30 Km/h. Accordingly, in order to keep a temperature of the drive motor being lower than a predetermined temperature, the drive motor is cooled in advance by temporarily increasing the output of the cooling apparatus.

The second supercooling step is performed by decreasing the output of the cooling apparatus to be in proportion to the speed of the electric vehicle after increasing the output of the cooling apparatus to be higher than an output corresponding to a current speed of the electric vehicle, which is similar to the first supercooling step.

FIG. 3 is a graph showing changes in the output of the cooling apparatus controlled by the method of cooling control according to the present invention; and FIG. 4 is a flow chart showing the method of cooling control according to the present invention.

As shown in FIG. 3, when the electric vehicle currently running at a speed of D is decelerated to a speed of A, the output of the cooling apparatus is increased by predicting the deceleration in advance in the sensing step. In other words, the output of the cooling apparatus is controlled to be in proportion to a current speed of the electric vehicle, but in the case of sudden deceleration, and more specifically, in the case of deceleration to a speed lower than 10 km/h, the output of the cooling apparatus is temporarily increased.

After that, when the speed of the electric vehicle is increased from the speed of A to the speed of D, the sensing step predicts the speed increase in advance, and thereby the output of the cooling apparatus is increased. Here, the output of the cooling apparatus is also increased much higher than an output corresponding to a current speed of the electric vehicle. To be more specific, when the driving speed of the electric vehicle is increased from lower than 10 km/h to higher than 30 Km/h, the output of the cooling apparatus is temporarily increased.

FIG. 4 schematically shows the processes described above. In other words, the output of the cooling apparatus is controlled to be in proportion to a current speed of the electric vehicle, wherein when the vehicle speed is predicted to be decreased, for example, when moving from a straight road to a curved road, the output of the cooling apparatus is temporarily increased, and on the contrary, when the vehicle speed is predicted to be increased, for example, when moving from a curved road to a straight road, the output of the cooling apparatus is temporarily increased.

Although a preferred embodiment of the present invention has been described for illustrative purposes, those skilled in the art will appreciate that various modifications, additions and substitutions are possible, without departing from the scope and spirit of the invention.

The above described embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. A method of cooling control for a drive motor of an electric vehicle, the method comprising:
   performing a normal driving step of controlling an output of a cooling apparatus for cooling the drive motor of the electric vehicle, the output controlled to be in proportion to a driving speed of the electric vehicle;
   performing a sensing step of predicting changes in the driving speed of the electric vehicle during the normal driving step;
   performing a first supercooling step of cooling residual heat of the drive motor prior to beginning of deceleration by temporarily operating the cooling apparatus at a higher output than the output controlled in the normal driving step, when deceleration is predicted in the sensing step; and
   performing a second supercooling step of cooling the drive motor in advance by temporarily operating the cooling apparatus at the higher output than the output controlled in the normal driving step when acceleration is predicted in the sensing step after performing the first supercooling step.

2. The method of claim 1, wherein the first supercooling step is performed when the driving speed of the electric vehicle is predicted to be decreased to lower than 10 Km/h.

3. The method of claim 2, wherein the second supercooling step is performed when the driving speed of the electric vehicle is predicted to be increased to higher than 30 Km/h after performing the first supercooling step.

4. The method of claim 1, wherein the second supercooling step is performed when the driving speed of the electric vehicle is predicted to be increased to higher than 30 Km/h after performing the first supercooling step.

5. The method of claim 1, wherein the sensing step predicts that the electric vehicle is to be decelerated when a curved section exists in front of the electric vehicle running on a straight section of a road.

6. The method of claim 5, wherein the sensing step uses a navigation system to predict that the electric vehicle is to be decelerated when the curved section exists in front of the electric vehicle running on the straight section.

7. The method of claim 5, wherein the sensing step predicts that the electric vehicle is to be accelerated when a second straight section exists in front of the electric vehicle running on the curved section.

8. The method of claim 7, wherein the sensing step uses a navigation system to predict whether the curved section or the second straight section exists on the road in front of the electric vehicle running on the road.

9. The method of claim 1, wherein the sensing step predicts that the electric vehicle is to be accelerated when a straight section exists in front of the electric vehicle running on a curved section of a road.

10. The method of claim 9, wherein the sensing step uses a navigation system to predict that the electric vehicle is to be accelerated when the straight section exists in front of the electric vehicle running on the curved section.

11. A method of cooling control for a drive motor of an electric vehicle, the method comprising:
    performing a normal driving step of controlling an output of a cooling apparatus for cooling the drive motor of the electric vehicle, the output controlled to be in proportion to a driving speed of the electric vehicle;
    using a navigation system to perform a sensing step of predicting changes in the driving speed of the electric vehicle during the normal driving step;
    performing a first supercooling step of cooling residual heat of the drive motor prior to beginning of deceleration by temporarily operating the cooling apparatus at a higher output than the output controlled in the normal driving step, when deceleration is predicted in the sensing step; and
    performing a second supercooling step of cooling the drive motor in advance by temporarily operating the cooling apparatus at the higher output than the output controlled in the normal driving step when acceleration is predicted in the sensing step after performing the first supercooling step.

12. The method of claim 11, wherein the first supercooling step is performed when the driving speed of the electric vehicle is predicted to be decreased to lower than 10 Km/h.

13. The method of claim 12, wherein the second supercooling step is performed when the driving speed of the electric vehicle is predicted to be increased to higher than 30 Km/h after performing the first supercooling step.

14. The method of claim 11, wherein the second supercooling step is performed when the driving speed of the electric vehicle is predicted to be increased to higher than 30 Km/h after performing the first supercooling step.

15. The method of claim 11, wherein the sensing step predicts that the electric vehicle is to be decelerated when a curved section exists in front of the electric vehicle running on a straight section of a road.

16. The method of claim 15, wherein the sensing step predicts that the electric vehicle is to be accelerated when a second straight section exists in front of the electric vehicle running on the curved section.

17. The method of claim 11, wherein the sensing step predicts that the electric vehicle is to be accelerated when a straight section exists in front of the electric vehicle running on a curved section of a road.

\* \* \* \* \*